US011627465B2

(12) United States Patent
Lanov et al.

(10) Patent No.: US 11,627,465 B2
(45) Date of Patent: Apr. 11, 2023

(54) TOKEN-BASED ACCESS FOR INTERNET-OF-THINGS DEVICES IN WIRELESS WIDE AREA NETWORKS

(71) Applicant: Cisco Technology, Inc., San Jose, CA (US)

(72) Inventors: Dennis Lanov, Richardson, TX (US); Solomon Ayyankulankara Kunjan, Apex, NC (US); Tariq Habibullah, Allen, TX (US); Guilherme Razzolini Correia, Morrisville, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 127 days.

(21) Appl. No.: 17/344,289

(22) Filed: Jun. 10, 2021

(65) Prior Publication Data
US 2022/0400379 A1    Dec. 15, 2022

(51) Int. Cl.
*H04W 12/06* (2021.01)
*H04W 12/069* (2021.01)
*H04W 80/02* (2009.01)
*H04W 12/71* (2021.01)
*H04W 12/08* (2021.01)

(52) U.S. Cl.
CPC ......... *H04W 12/069* (2021.01); *H04W 12/08* (2013.01); *H04W 12/71* (2021.01); *H04W 80/02* (2013.01)

(58) Field of Classification Search
CPC ............................ H04W 12/069; H04W 12/08
See application file for complete search history.

(56) References Cited

U.S. PATENT DOCUMENTS

| | | | |
|---|---|---|---|
| 10,667,135 B2 | 5/2020 | Grayson et al. | |
| 10,944,757 B2 | 3/2021 | Brinckman et al. | |
| 2017/0347264 A1* | 11/2017 | Holland | H04L 9/3242 |
| 2018/0035248 A1* | 2/2018 | Soave | H04W 4/025 |
| 2018/0316673 A1* | 11/2018 | Shah | H04W 12/06 |
| 2018/0338242 A1* | 11/2018 | Li | H04W 12/041 |
| 2019/0289006 A1* | 9/2019 | Fang | H04W 12/35 |
| 2019/0387401 A1 | 12/2019 | Liao et al. | |
| 2020/0059976 A1 | 2/2020 | Bhatia et al. | |

(Continued)

OTHER PUBLICATIONS

IEEE, "Guidelines for Use of Extended Unique Identifier (EUI), Organizationally Unique Identifier (OUI), and Company ID (CID)", IEEE Standards Association, Aug. 3, 2017, 19 pages.

(Continued)

*Primary Examiner* — Ponnoreay Pich
(74) *Attorney, Agent, or Firm* — Edell, Shapiro & Finnan, LLC

(57) ABSTRACT

Presented herein are techniques in which a network device obtains a request from an Internet of Things (IoT) device to access a wireless wide area (WWA) access network. The request includes a token and an identifier associated with the IoT device. The network device transmits a verification request to an IoT vendor associated with the IoT device to determine whether the token and the identifier are valid and obtains an indication from the IoT vendor that the token and the identifier are valid. The network device facilitates connection of the IoT device to the WWA access network based on obtaining the indication that the token and the identifier are valid.

20 Claims, 11 Drawing Sheets

(56) References Cited

U.S. PATENT DOCUMENTS

2020/0084202 A1    3/2020    Smith et al.
2021/0120403 A1*  4/2021    Fajri ................... H04W 12/04

OTHER PUBLICATIONS

3GPP, "3rd Generation Partnership Project; Technical Specification Group Services and System Aspects; System architecture for the 5G System (5GS); Stage 2 (Release 17)", 3GPP TS 23.501 V17.0.0, Mar. 2021, 489 pages.

3GPP, "3rd Generation Partnership Project; Technical Specification Group Services and System Aspects; Procedures for the 5G System (5GS); Stage 2 (Release 17)", 3GPP TS 23.502 V17.0.0, Mar. 2021, 646 pages.

3GPP, "3rd Generation Partnership Project; Technical Specification Group Services and System Aspects; Security architecture and procedures for 5G system (Release 17)", 3GPP TS 33.501 V17.1.0, Mar. 2021, 256 pages.

Yuanyu Zhang, et al., "Smart Contract-Based Access Control for the Internet of Things," IEEE Internet of Things Journal, vol. 6, No. 2, Apr. 2019, 12 pages.

"DASH-IF Implementation Guidelines:Token-based Access Control for DASH (TAC)," DASH Industry Forum, Draft Version 1.0 (Final), Feb. 19, 2019, 24 pages; https://dashif.org/docs/DASH-TAC-v1.0.htm.

Timothy Claeys, et al., "Securing Complex IoT Platforms with Token Based Access Control and Authenticated Key Establishment," 2017 International Workshop on Secure Internet of Things, retrieved from the Internet May 16, 2022.

Shih-Hsiung Lee, et al., "TBAS: Token-based authorization service architecture in Internet of things scenarios," Semantic Scholar, Jul. 1, 2017, 6 pages.

"3rd Generation Partnership Project; Technical Specification Group Core Network and Terminals; Non-Access-Stratum (NAS) protocol for 5G System (5GS); Stage 3; (Release 17)," 3GPP TS 24.501 V17.2.1, Apr. 2021, 757 pages.

\* cited by examiner

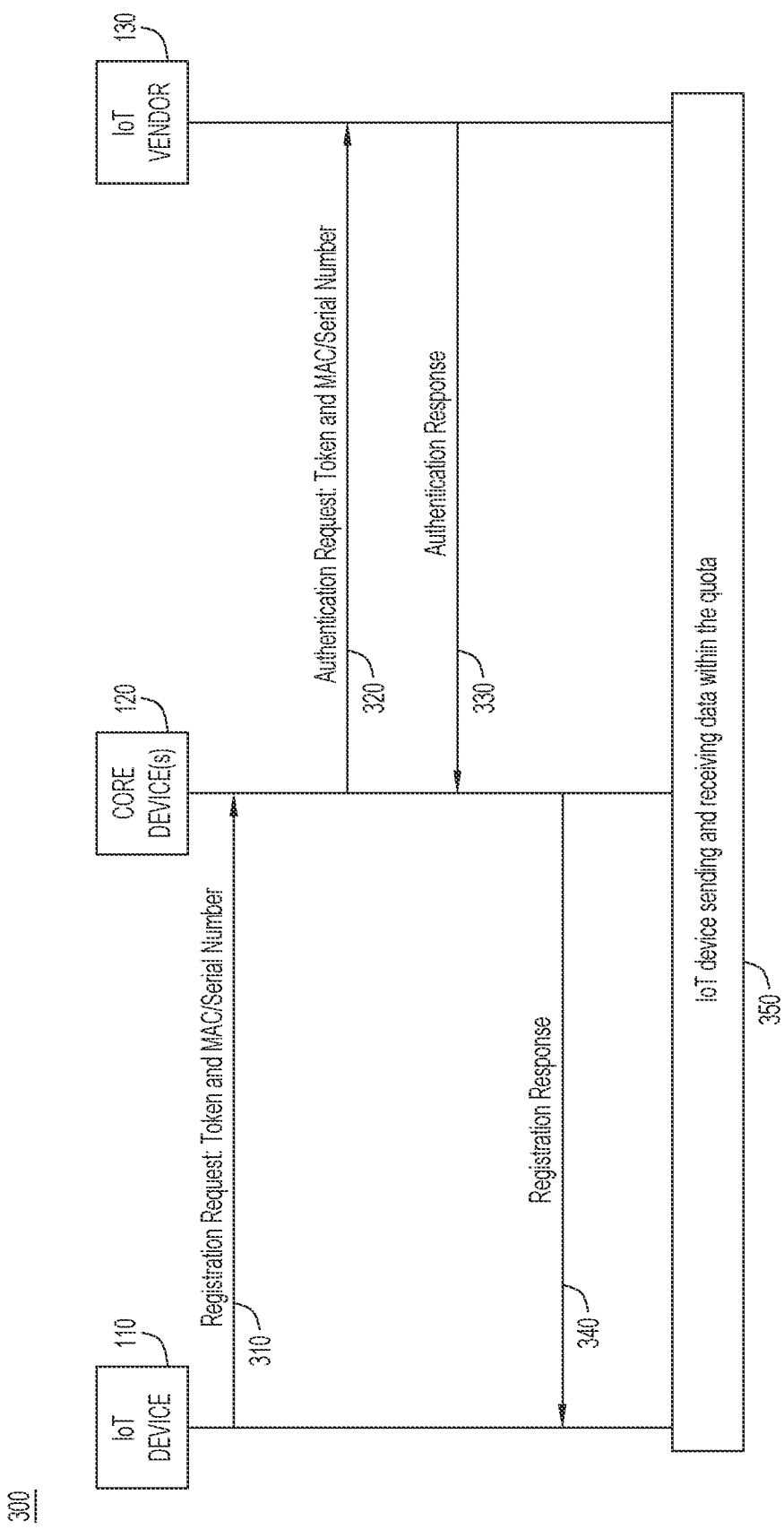

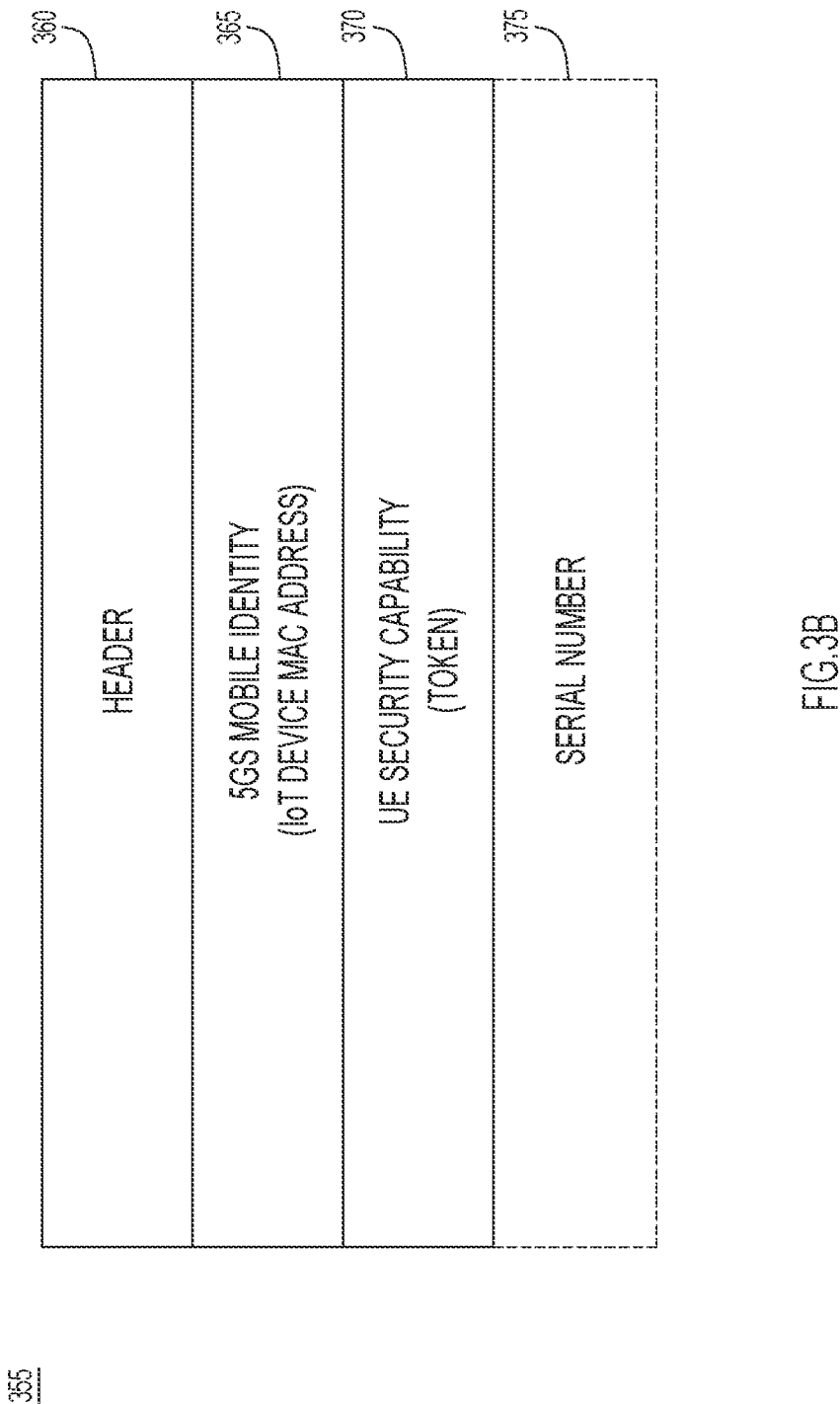

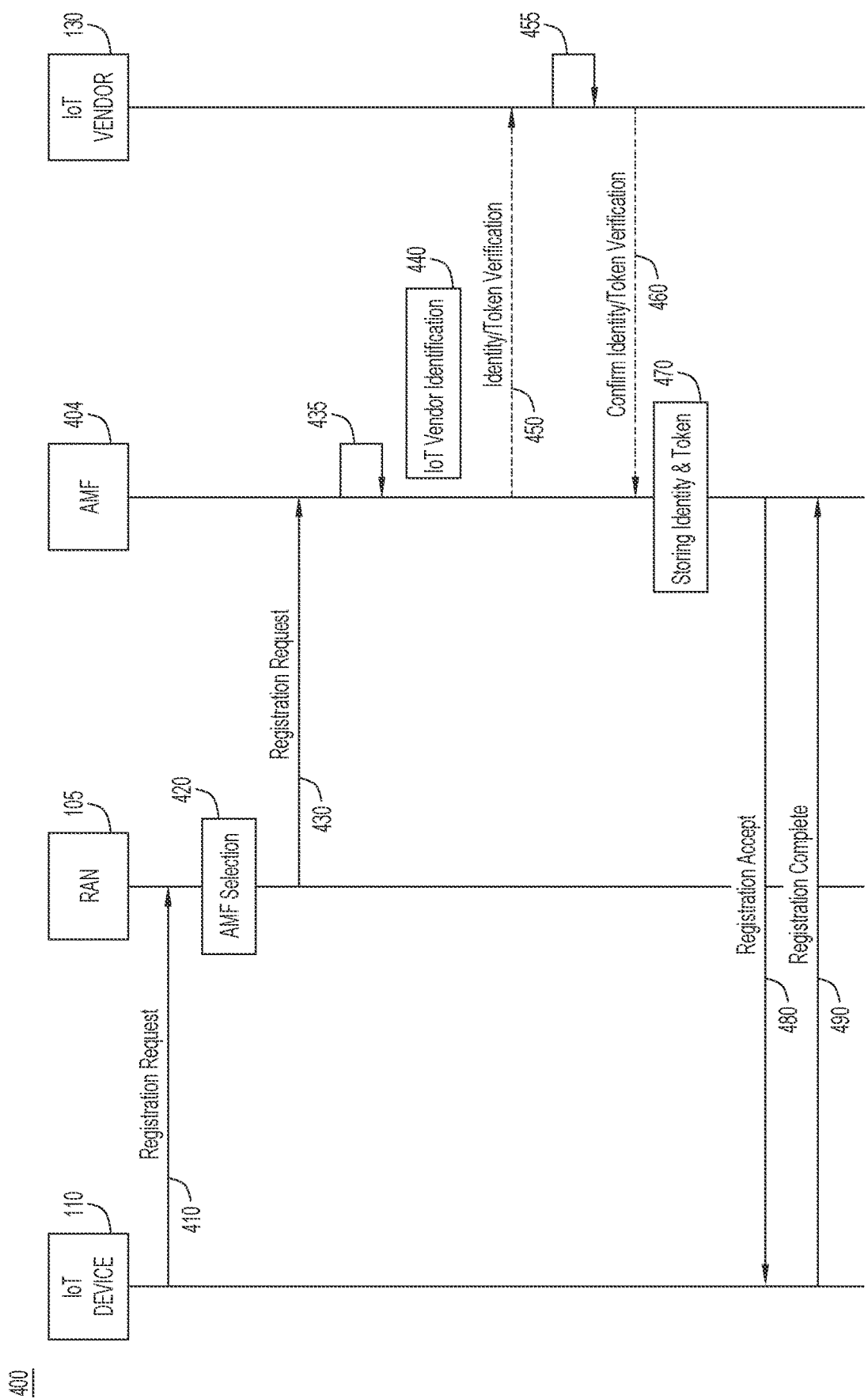

_(1)_

TOKEN-BASED ACCESS FOR INTERNET-OF-THINGS DEVICES IN WIRELESS WIDE AREA NETWORKS

TECHNICAL FIELD

The present disclosure relates to network equipment and services.

BACKGROUND

Currently, an Internet-of-Things (IoT) device may attach to a radio access network of a service provider using a subscription identifier for the IoT device, such as an International Mobile Subscriber Identity (IMSI) or 5G globally unique Subscription Permanent Identifier (SUPI), for a subscription between the IoT device and the service provider that allows the IoT device to attach to the radio access network. It can be challenging to manage the subscriptions for a large number of IoT devices that may seek connections to a service provider radio access network.

BRIEF DESCRIPTION OF THE DRAWINGS

FIG. 3A is a message sequence diagram illustrating a call flow associated with registration of an IoT device for connecting to a service provider network, according to an example embodiment.

FIG. 3B is a diagram illustrating a registration request message, according to an example embodiment.

FIG. 4 is a message sequence diagram illustrating another call flow associated with registration of an IoT device for connecting to a service provider network, according to an example embodiment.

DESCRIPTION OF EXAMPLE EMBODIMENTS

Overview

Figure 1:
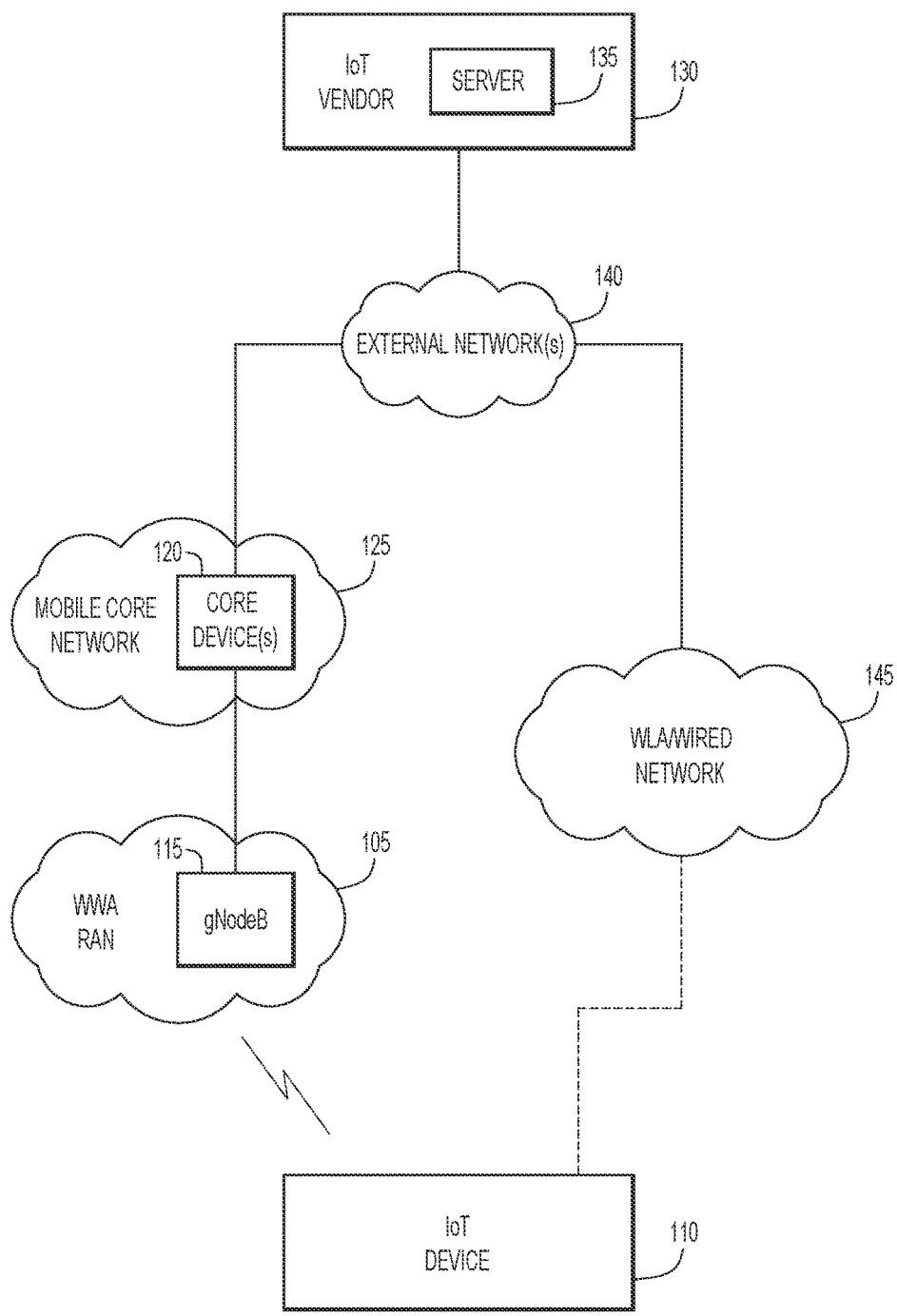
FIG. 1 is a diagram of a system in which techniques may be implemented to facilitate connection of an IoT device to a service provider network without a subscription with the service provider, according to an example embodiment.

It is estimated that up to 30 billion IoT devices will be connected to the Internet within the next several years. With such overwhelming demand for internet connectivity by IoT devices, allocating, maintaining, and securing the subscription identifiers (IMSI/SUPI) of the IoT devices may be a challenge. Some IoT devices, such as wearable IoT devices, may provide a full range of capabilities to users without requiring high speed communication capabilities. These IoT devices may utilize the coverage of trusted networks, such as Bluetooth or Wi-Fi networks, and may not be subscribed to access a service provider's services. However, in current implementations when an IoT device is out of range of a trusted network or when a trusted network is unavailable, the IoT device may have to subscribe to a service provider to access services provided by the service provider. Techniques presented herein provide for facilitating access of an IoT device to services provided by a service provider without the IoT device having a subscription with the service provider.

In particular, techniques presented herein may utilize a Serial Number and/or Media Access Control (MAC) number or address of an IoT device in combination with a token stored at the IoT device for registering the IoT device with a mobile core network of a service provider in order to allow the IoT device to send and receive data via a wireless wide area (WWA) access network of the service provider (e.g., a Fifth ($5^{th}$) Generation (5G) access network) without involving a subscription for the IoT device with the service provider. The token can be obtained by the IoT device from an IoT vendor. When the IoT device attempts to access the WWA access network, a mobile core network associated with the WWA access network obtains the MAC address and token from the IoT device and validates the token with the IoT vendor. If the MAC address and token are valid, the IoT device may complete connection to the WWA access network to send and/or receive data.

In one instance, the token may be associated with a quota and the IoT device may consume an amount of data indicated by the quota while the IoT device is connected to the WWA access network and while the token is valid. If the quota is exhausted and/or an old token is provided to access the WWA access network, the network may ban the IoT device until a new token is provided. The IoT device stores the latest token obtained from the IoT vendor, which can be periodically renewed following a renewal time interval. The token may be associated with a token validity time that can be multiple times larger than the token renewal time interval.

Example Embodiments

As referred to herein, a wireless wide area (WWA) access network, such as cellular/Third (3rd) Generation Partnership Project (3GPP) access network, may be characterized as a Radio Access Network (RAN) having radio nodes such as evolved Node Bs (eNBs or eNodeBs) for Fourth (4th) Generation (4G)/Long Term Evolution (LTE) access networks, next generation Node Bs (gNBs or gNodeBs) for 5G and/or next Generation (nG) access networks (e.g., Sixth (6th) Generation (6G), etc.), and/or the like that provide a larger RAN coverage area as compared to the RAN coverages area of a wireless local area (WLA) access network or wireless local area network (WLAN) typically provided by WLA radio nodes (e.g., Institute of Electrical and Electronics Engineers (IEEE) 802.11 access points, Wi-Fi® access points, Wi-Fi6® access points, etc.). Stated differently, the WWA RAN coverage area provided by a WWA radio node is typically larger (sometimes orders of magnitude larger, for example, up to a ratio of 1:5, depending on spectrum and power regulations) than the WLA RAN coverage area provided by a WLA radio node. Additionally, a WWA RAN radio node can typically provide radio access connectivity for a larger number of devices as compared to a WLA RAN radio node. Depending on implementation, any combination of WWA and/or WLA RANs may be utilized to facilitate connections between one or more devices and any combination of Local Area Networks (LANs), such as an enterprise network for an enterprise location; Wide Area Networks (WANs), such as the Internet, multiple enterprise networks spread across multiple locations; Software Defined WAN (SD-WAN); and/or any other network architecture/environment.

Referring to FIG. 1, FIG. 1 is a block diagram of a system 100 in which techniques may be implemented to provide an IoT device access to a WWA access network, such as a 5G access network, according to an example embodiment.

System 100 may include an IoT device 110, a WWA Radio Access Network (RAN) 105, mobile core network 125, one or more external data network(s) 140, an IoT vendor 130, and WLA/wired network 145. In at least one embodiment, mobile core network 125 may be representative of a 5G core network or system (5GC or 5GS) including core device(s) 120. Core device(s) 120 may correspond to any combination of an Access and Mobility Management Function (AMF), a Session Management Function (SMF), a User Plane Function (UPF), a Policy Control Function (PCF), a Unified Data Management (UDM) entity, and/or any other network function device located in mobile core network 125 as may be prescribed by 3GPP standards. In addition to various operations discussed for techniques herein, an AMF may facilitate access and mobility management control/services for one or more user devices or IoT devices, such as IoT device 110, to facilitate one or more over-the-air (OTA) RF connection(s) between the IoT device 110 and the gNodeB 115. The WWA RAN 105 may include a 5G/nG gNodeB 115. Although not illustrated, mobile core network 125 may also include any combination of 4G/nG network elements. As illustrated in FIG. 1, gNodeB 115 may interface with core device(s) 120. In addition, core device(s) 120 may interact with IoT vendor 130 via external network(s) 140 to validate a token and identity associated with IoT device 110, according to implementations herein.

A gNodeB, such as gNodeB 115, may implement any combination of a WWA (e.g., cellular) and, in some instances, also a WLA (e.g., Wi-Fi®) air interface for any combination of Radio Access Technology (RAT) types (sometimes referred to more generally as 'accesses') for WWA RAN 105 such as, 3GPP licensed spectrum accesses (e.g., 5G/New Radio (NR) accesses); 3GPP unlicensed spectrum accesses (e.g., Licensed-Assisted Access (LAA), enhanced LAA (eLAA), further enhanced LAA (feLAA), and New Radio Unlicensed (NR-U)); non-3GPP unlicensed spectrum accesses such as Institute of Electrical and Electronics Engineers (IEEE) 802.11 (e.g., Wi-Fi®); IEEE 802.16 (e.g., WiMAX®), Near Field Communications (NFC), Bluetooth®, and/or the like; Citizens Broadband Radio Service (CBRS) accesses; combinations thereof; and/or the like.

Thus, gNodeB 115 may include hardware and/or software to perform baseband signal processing (such as modulation/demodulation) as well as hardware (e.g., baseband processors (modems), transmitters and receivers, transceivers, and/or the like), software, logic and/or the like to facilitate signal transmissions and signal receptions via antenna assemblies (not shown) in order to provide over-the-air Radio Frequency (RF) coverage for one or more access types (e.g., 4G/LTE, 5G, nG, CBRS, etc.) through which one or more user devices or IoT devices, such as IoT device 110, may utilize to connect to one or more gNodeBs for one or more sessions (e.g., voice, video, data, gaming, combinations thereof, etc.).

An IoT device, such as IoT device 110, may be associated with any user (e.g., a user equipment (UE)), subscriber, employee, client, customer, electronic device, etc. wishing to initiate a flow in system 100 and may be inclusive of any device that initiates a communication in system 100, such as a computer, an electronic device such as an industrial device (e.g., a robot), automation device, enterprise device, appliance, Internet of Things (IoT) device (e.g., sensor, monitor, etc.), a laptop or electronic notebook, a router with a WWA/WLA interface, a WWA/WLA (cellular/Wi-Fi®) enabled telephone/smart phone, tablet, etc. and/or any other device, component, element, or object capable of initiating voice, audio, video, media, or data exchanges within system 100. It is to be understood that IoT devices discussed herein may also be configured with any combination of hardware (e.g., communications units, receiver(s), transmitter(s), transceiver(s), antenna(s) and/or antenna array(s), processor(s), memory element(s), baseband processor(s) (modems), etc.)], controllers, software, logic, and/or any other elements/entities that may facilitate over-the-air RF connections with one or more access networks. As referred to herein, the terms 'UE,' 'UE device,' 'user device,' and 'IoT device' can be used interchangeably.

An IoT vendor, such as IoT vendor 130, may include one or more devices, functions, logic, and/or the like that are associated with a manufacturer, vendor, or any other entity associated with IoT device 110. Server 135 may include hardware and/or software configured to exchange data with IoT device 110, store information associated with IoT device 110, obtain sensor or other information from IoT device, determine instructions for IoT device 110 based on the received sensor or other information, and/or perform additional functions with respect to IoT device 110. IoT vendor 130 and/or server 135 and may exchange data with IoT device 110 via any combination of a WWA network, a WLA network, and/or via another network, such as a wired network, to provide services to IoT device 110. For example, IoT vendor 130 and/or server 135 may transmit a token to IoT device 110 via WLA/wired network 145. IoT vendor 130 and/or server 135 may additionally receive sensor and/or other information from IoT device 110 and may transmit instructions, updates, etc. to IoT device 110 via WWA RAN 105 and/or WLA/wired network 145. IoT vendor 130 may communicate with core device(s) 120 in mobile core network 125 via external data network(s) 140 to verify a token provided to core device(s) 120 by IoT device 110.

In various embodiments, the external data network(s) 140 of FIG. 1 may be any combination of the Internet, an Internet Protocol (IP) Multimedia Subsystem (IMS), an Ethernet network, Ethernet switching system(s), and/or the like. In various embodiments, WLA/wired network 145 may be any combination of a WLA network and/or a wired network and may include, for example, the Internet, a Wi-Fi network, a Bluetooth network, an Ethernet network, Ethernet switching system(s), and/or the like. In some embodiments, external data network(s) 140 may overlap in whole or in part with WLA/wired network 145.

In accordance with techniques discussed herein, system 100 may provide for registering IoT device 110 to temporarily access a service provider's network (e.g., a 5G network) without requiring IoT device 110 to subscribe to services provided by the service provider.

Consider various operational examples involving system 100. Broadly, operations involving system 100 may include IoT device 110 obtaining a token from IoT vendor 130 via WLA/wired network 145. Core device(s) 120 of the mobile core network obtain, from IoT device 110, an identifier associated with IoT device 110 and the token stored on IoT device 110. In contrast to current implementations in which an IMSI, SUPI, or the like associated with a service provider subscription through which WWA access may be granted, any combination of a serial number and/or a MAC address for the IoT device 110 may be used as an identifier for the IoT device 110 in combination with the token for attempting to connect to a WWA access network in accordance with embodiments herein.

In various embodiments, a serial number (S/N) may include any multi-digit alphanumeric number and/or the like that may be used to identify the IoT device 110 to the IoT vendor 130. A MAC number or address typically includes six groups of two hexadecimal digits ('2A:7A:3D:7E:3E:80') and may include an Organizationally Unique Identifier (OUI) and/or a company ID (CID) that can be used to identify the IoT vendor 130 of IoT device 110. In various embodiments, the token may be defined by IoT vendor 130 and may be any alphanumeric value.

Based on the identifier (e.g., S/N and/or MAC address), core device(s) 120 identify an IoT vendor 130 associated with IoT device 110 and verify the validity of the identifier and the token with the IoT vendor 130. When the token and identifier are valid, core device(s) 120 allow IoT device 110 to complete registration to the WWA RAN 105, which allows the IoT device 110 to send and receive data via the WWA RAN 104. Thus, the IoT device 110 may connect to the WWA RAN 105 without IoT device 110 having a subscription to connect to the WWA RAN 105.

In some embodiments, IoT device 110 can exchange data using the WWA RAN 105 until a data quota associated with the token has been exhausted. In some embodiments, IoT device 110 may periodically renew the token prior to an expiration of the token. Since no subscription with a service provider is involved for techniques herein, IoT device 110 may attempt to access any network in the range of IoT device 110. In this way, IoT device 110 may be able to connect to a first access network covered by a first service provider when IoT device 110 is in one location and may be able to connect to a second access network covered by a second service provider when IoT device 110 is in a different area that is not covered by the first service provider.

Figure 2:
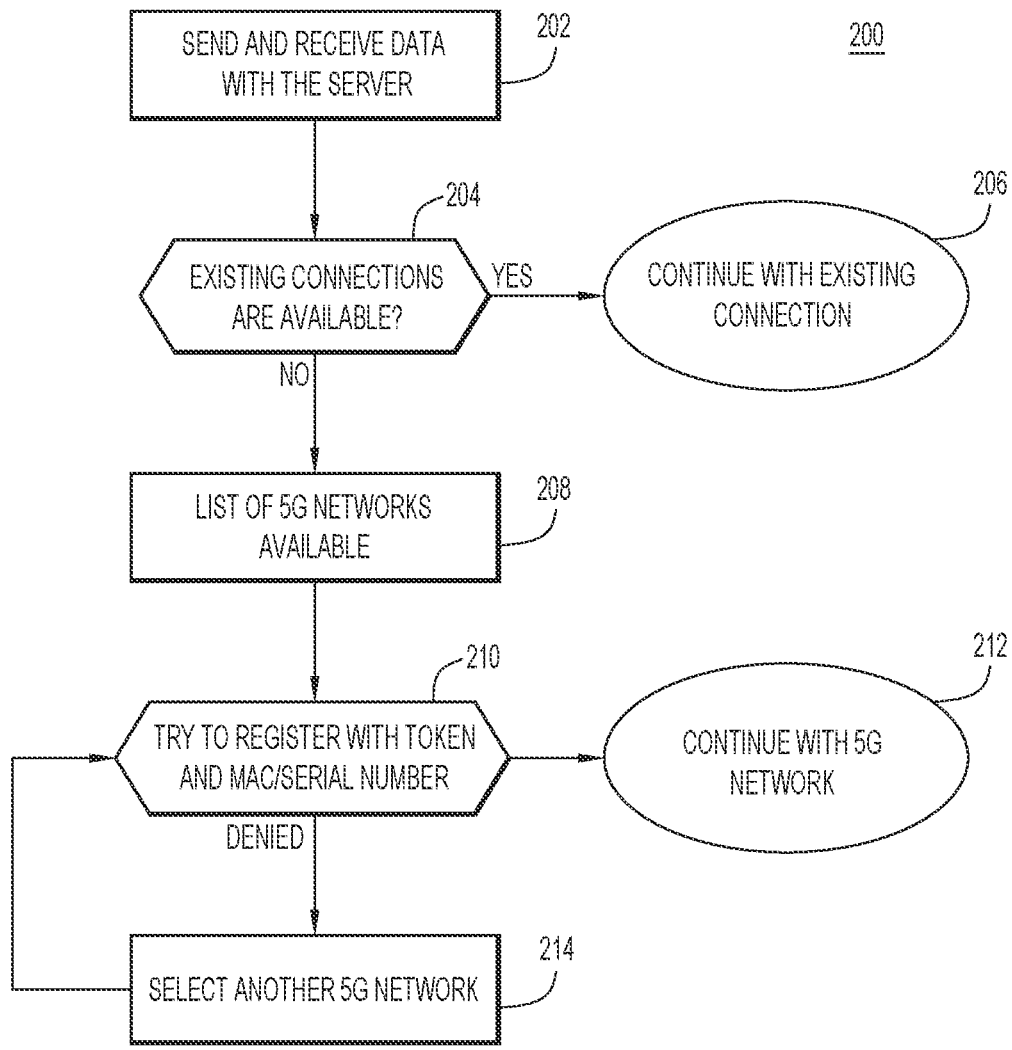
FIG. 2 is a flow chart depicting a method for IoT device network selection, according to an example embodiment.

Referring to FIG. 2, FIG. 2 is a flow chart illustrating a method 200 for identifying a service provider's network over which to send and receive data, according to an example embodiment. In at least one embodiment, method 200 illustrates example operations that may be performed, at least in part, by IoT device 110 and mobile core network 125, according to an example embodiment.

As shown at 202, the method may include sending data to and receiving data from a server, such as server 135 (not shown in FIG. 2). Server 135 may be a server associated with IoT vendor 130. For example, IoT device 110 may collect data or metrics and may report the data or metrics to server 135. Additionally, IoT device 110 may receive instructions or other information from server 135. In one implementation, IoT device 110 may send and receive the data via WLA/wired network 145 using, for example, an Ethernet connection or a Wi-Fi connection (e.g., at a user's home, car, office, etc.). In another implementation, IoT device 110 may send and receive the data using a tethered connection with a user device. For example, IoT device 110 may connect to another user device using Bluetooth or another wired or wireless connection and IoT device 110 may send and receive data via a network associated with the user device (e.g., a Wi-Fi network, a 5G network, a 4G LTE network, etc.).

In one example, IoT device 110 may correspond to a fitness device, a wearable device, and/or the like that may transmit data (e.g., steps taken by a user, distance walked or run by a user, etc.) to a server. As another example, IoT device 110 may correspond to a medical wearable device that detects health parameters (e.g., heart rate, blood pressure, sugar levels, etc.) associated with the user and reports the health parameters to a server. The medical wearable device may additionally detect when one or more health parameters reaches a critical threshold and may send the health parameter information and the user's location to the server.

At 204, IoT device 110 determines whether existing connections are still available. For example, IoT device 110 may determine whether the Ethernet connection, Wi-Fi connection, Bluetooth connection, or other connection used to send and receive data with the server is still available. If the connection is still available, at 206, IoT device 110 continues to send and receive data using the existing connection.

If the existing connection is no longer available, at 208, IoT device 110 obtains a list of WWA access networks that are available in the location of IoT device 110, such as one or more 5G access network(s) provided via WWA RAN 105. For example, the existing Ethernet, Wi-Fi, Bluetooth, or other connection may be temporarily unavailable due to a failure or for another reason or IoT device 110 may have moved to a different location where the existing connection is not available. For example, in the case where IoT device 110 is a fitness tracker, the user of IoT device 110 may have left home to go for a walk or a run without the user device to which IoT device 110 was connected, so IoT device 110 may not be able to access a Wi-Fi connection or a Bluetooth connection with the user device. In the case where IoT device 110 is a medical wearable device, the existing connection may be temporarily unavailable, but IoT device 110 may be required to send health parameters in an emergency situation (e.g., when a health parameter reaches a critical level). In this case, IoT device 110 may search for available WWA access networks to which the IoT device may connect in the current location. In one implementation, IoT vendor 130 may create a prioritized list of WWA access networks and store the list at IoT device 110. When IoT device 110 searches for available WWA access networks, IoT device 110 may search for the first WWA access network on the list. If the first WWA access network on the list is not available, IoT device 110 may search for the next WWA access network on the list until IoT device 110 identifies an available WWA access network from the list.

At 210, IoT device 110 attempts to register with a WWA access network on the list using the serial number and/or MAC address of IoT device 110 and a token stored on IoT device 110. The token may have been obtained from an IoT vendor 130 associated with IoT device 110. For example, IoT device 110 may have obtained the token from IoT vendor 130 using a connection that does not involve access to a WWA access network. For example, IoT device 110 may have obtained the token using a Wi-Fi connection, an Ethernet connection, a Bluetooth connection, or another connection to a non-cellular network. IoT device 110 may have obtained the token based on paying a fee to IoT vendor 130. As further discussed below, IoT device 110 may transmit the serial number/MAC address and token to a core device 120 of the WWA access network.

If the attempt to register is successful, at 212, IoT device 110 may complete connection to the WWA RAN 105 and the mobile core network 125 and may continue to send and receive data with the server using the connection. In at least one embodiment, IoT device 110 may use a limited amount of data based on a data quota associated with the token. For example, IoT device 110 may send and/or receive the limited amount of data corresponding to the data quota via a service provider's WWA RAN without having a subscription with the server provider. If the attempt to register with the WWA access network is unsuccessful, at 214, IoT device 110 may select another WWA access network in the range of IoT device 110 from the list and may attempt to register with the other network. For example, IoT device 110 may send the serial number/MAC address and token to the other WWA access network. If the request is denied, IoT device 110 may continue to try to register to connect with additional WWA access network(s) on the list.

Accordingly, techniques herein may provide for using a serial number/MAC address and token to access a WWA access network to send and receive a limited amount of data without subscribing to a service provider.

Referring to FIG. 3A, FIG. 3A is a diagram depicting a method 300 according to an example embodiment. In at least one embodiment, method 300 illustrates example operations that may be performed, at least in part, by IoT device 110, core device(s) 120, and IoT vendor 130, according to an example embodiment. Method 300 depicts a method in which IoT device 110 registers to connect to a service provider's network, such as WWA RAN 105/mobile core network 125, when an existing network (e.g., a Wi-Fi or wired network) is not available.

At 310, the method may include IoT device 110 transmitting a Non-Access Stratum (NAS) protocol registration request including the serial number and/or the MAC address of IoT device 110 and a token stored at IoT device 110 to core device(s) 120 via the WWA RAN 105 (not shown in FIG. 3A) associated with the core device(s) 120. 3GPP Technical Specification (TS) 24.501 allows for including an IoT MAC address as part of a 5GS mobile identity in a registration request message. In one embodiment, if the registration request includes a serial number in combination with the MAC address of the IoT device 110, the serial number may be included in a vendor-specific information element. In one embodiment, the token can be included as a UE security capability in the registration request message. The token may have been obtained by IoT device 110 from IoT vendor 130. For example, IoT device 110 may have registered with IoT vendor 130 and may have paid a fee to IoT vendor 130 to obtain a token in order to temporarily access a WWA access network in the range of IoT device 110.

Referring to FIG. 3B, FIG. 3B is a simplified diagram illustrating example details associated with an example NAS protocol registration request format 355 that may be used to communicate the token and identification information for IoT device 110 to core device(s) 120, according to an example embodiment.

In at least one embodiment, NAS protocol registration request format 355 may include various fields including, but not limited to, a header field 360, a 5GS mobile identity field 365, a UE security capability field 370, and a serial number field 375. Header field 360 may include information for addressing and routing the registration request message, such as source address, destination address, etc. 5GS mobile identity field 365 may include the MAC address associated with IoT device 110 or, in some embodiments, may include the serial number of the IoT device 110. UE security capability field 370 may include the token. If the registration request includes both the serial number and the MAC address for IoT device 110, serial number field 375 may include the serial number associated with IoT device 110. In one implementation, if the serial number is included in the registration request along with the MAC address (which may be carried in the 5GS mobile identity field 365), serial number field 375 may be configured as a vendor-specific information element that includes the serial number.

Referring back to FIG. 3A, core device(s) 120 are in the mobile core network 125 of the service provider with which the IoT device 110 is attempting to connect. At 320, core device(s) 120 attempt to authenticate IoT device 110 by sending an authentication request including the serial number/MAC address and token to IoT vendor 130. IoT vendor 130 determines whether the serial number/MAC address and token are valid for IoT device 110 and, at 330, transmits the authentication response to core device(s) 120 indicating that the serial number/MAC address and token are valid.

At 340, core device(s) 120 transmits a registration response to IoT device 110. In this example, the serial number/MAC address and the token are assumed to be valid, thus, the response indicates that IoT device 110 may connect to the network to send and receive data. At 350, IoT device may send and receive data (e.g., with a server associated with IoT device 110) until the data quota associated with the token has been exhausted.

Referring to FIG. 4, FIG. 4 is a diagram depicting a method 400 according to an example embodiment. In at least one embodiment, method 400 illustrates example operations that may be performed, at least in part, by IoT device 110, WWA RAN 105, AMF 404, and IoT vendor 130, according to an example embodiment. Method 400 depicts a method in which IoT device 110 registers to connect to a service provider's network, such as the WWA RAN 105/mobile core network 125, when an existing network, such as a WLAN or wired network, is not available.

At 410, IoT device 110 may send a registration request to WWA RAN 105 for connecting to the WWA RAN 105/mobile core network 125. As discussed above, the registration request may include an identifier (e.g. S/N and/or MAC address) associated with IoT device 110 and a token stored at IoT device 110. WWA RAN 105 receives the request and, at 420, selects an AMF device to process the request. For example, based on information contained in the registration request, RAN 105 may select AMF 404 to handle the registration request. At 430, RAN 105 transmits the registration request to AMF 404.

At 435, AMF 404 determines whether the registration request includes a serial number and/or MAC address for IoT device 110. If the registration request does not include a serial number/MAC address associated with IoT device 110, the request for access to the network can proceed using a SIM-based authentication for the IoT device 110, as further described below with respect to FIG. 5. When the registration request includes a serial number and/or MAC address for IoT device 110, at 440, AMF 404 triggers an identification of an IoT vendor associated with IoT device 110 to verify a validity of the token and serial number/MAC address. In one implementation, AMF 404 may identify the IoT vendor to perform the verification. In another implementation, AMF 404 may trigger another network function to identify the IoT vendor to perform the verification. The IoT vendor may be identified based on the identifier (e.g., a MAC address provided in the 5GS mobile identity) included in the registration request. For example, the IoT vendor may be identified based on the OUI of the MAC address.

In one implementation, AMF 404 may store a vendor mapping database that maps an OUI to an IoT vendor verification service associated with IoT vendor 130. The mapping may be defined by a configuration inside of AMF 404. For example, when a service provider network makes an agreement with an IoT vendor 130 to provide a service that allows IoT devices 110 to connect to the service provider network using a token and MAC address, AMFs 404 associated with the service provider network may be configured to store a mapping between the IoT vendor 130 and the OUI. When AMF 404 obtains the registration request from IoT device 110, AMF 404 may identify the OUI from the MAC address and may use the vendor mapping database to identify the IoT vendor verification service associated with IoT vendor 130 to verify the token and MAC address. The identified IoT vendor may be the IoT vendor 130 that provided the token to IoT device 110. In this example, AMF 404 may identify that IoT vendor 130 is associated with IoT device 110.

At 450, AMF 404 may transmit the identity and the token to IoT vendor 130 with a request to verify the validity of the token and the identity. At 455, the IoT vendor 130 may determine that the token and the identity are valid. In one implementation, the token may be a dual type or two-factor token and IoT vendor 130 may perform a two-factor authentication to determine whether the token is valid. In another implementation, IoT vendor 130 may perform a lookup to determine whether the token is valid. For example, IoT vendor 130 may determine whether the token is valid by determining whether a validity time associated with the token has expired and/or whether a data quota associated with the token has been exhausted.

At 460, IoT vendor 130 transmits a message to AMF 404 indicating that the identity and token have been verified and are valid. At 470, AMF 404 may store the identity and token in a database with an indication that the identity and token are valid. By storing the valid identity and token in the database, AMF 404 may be able to verify the validity of the identity and token in the future based on performing a lookup in the database. In this way, when AMF 404 receives a subsequent registration request with the identity and the token, AMF 404 may verify the validity of the identity and the token without sending an authentication request to IoT vendor 130. For example, when AMF 404 receives a subsequent registration request from IoT device 110 with an identity and a token, AMF 404 may perform a lookup in the local database to determine whether the identity and token match an identity and token that are valid. When the received identity and token match a valid identity and token in the database, AMF 404 may facilitate connection of IoT device 110 to a WWA access network without verifying the validity of the identity and token with IoT vendor 130.

At 480, AMF 404 may send a message to IoT device 110 indicating that the registration request has been accepted. At 490, IoT device 110 may send a message to AMF 404 indicating that the registration is complete. When the registration is complete, AMF 404 may facilitate connection of IoT device 110 to the WWA access network and IoT device 110 may send and receive data using the WWA access network until a data quota associated with the token has been exhausted.

Figure 5:
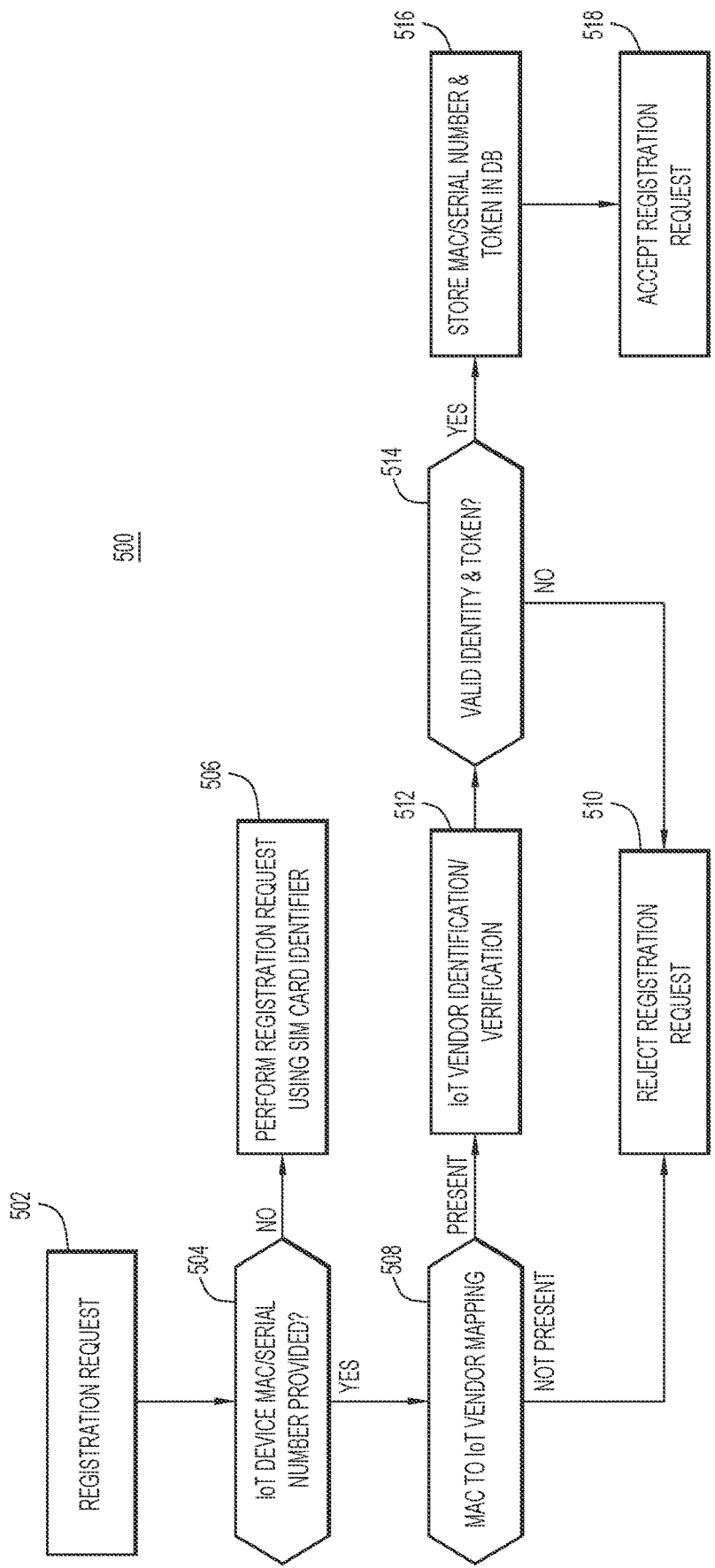
FIG. 5 is a flow chart depicting a method of registering an IoT device for connecting to a service provider network, according to an example embodiment.

Referring to FIG. 5, FIG. 5 is a flow chart illustrating a method 500 for identifying a network over which to send and receive data according to an example embodiment. In at least one embodiment, method 500 illustrates example operations that may be performed, at least in part, by IoT device 110, RAN 105, AMF 404, and IoT vendor 130, according to an example embodiment.

At 502, AMF 404 receives a registration request from IoT device 110 to connect to a WWA access network. At 504, it is determined whether a serial number/MAC address associated with IoT device 110 is included in the registration request. For example, AMF 404 or another device in mobile core network 125 or RAN 105 may receive the registration request and determine whether the registration request includes a serial number/MAC address associated with IoT device 110. If the registration request does not include the serial number/MAC address, at 506, the registration request process may continue using a SIM card identifier associated with IoT device 110. A user device that is capable of accessing a 5G network uses a Subscriber Identity Module (SIM) card with any combination of an IMSI, SUPI, a subscription concealed identifier (SUCI), a 5G globally unique temporary identifier (GUTI), and/or a 5G temporary mobile subscriber identity (TMSI) to identify the user device and perform a standard 3GPP SIM-based authentication for the user device. These identifiers are used for a 3GPP standards-based authentication of the user device to gain access to a service provider's cellular network. Thus, if the registration request does not include a serial number/MAC address associated with IoT device 110, the request for access to the network can proceed using a SIM-based authentication for the IoT device 110 for embodiments in which the IoT device may include a SIM card, as shown at 506.

If the MAC address associated with IoT device 110 is provided, at 508, a MAC address to IoT vendor mapping may be performed to identify whether an IoT vendor 130 is associated with the MAC address. For example, AMF 404 or another network function may attempt to identify an IoT vendor 130 based on the MAC address provided in the registration request. If an IoT vendor 130 is not identified based on the MAC address, at 510, the registration request is denied and IoT device 110 is denied access to the network. If the IoT vendor 130 is identified, at 512, AMF 404 transmits a request to IoT vendor 130 to verify whether the MAC address and a token included in the registration request are valid.

At 514, AMF 404 receives a response from IoT vendor 130 indicating whether the serial number/MAC address and token are valid. In one implementation, if no response is received from IoT vendor 130 within a particular amount of time, AMF 404 may re-transmit the request to IoT vendor 130 to verify the serial number/MAC address and token. If no response is received after a number of attempts (e.g., three attempts), AMF 404 will declare IoT device 110 not authenticated and IoT device 110 will be denied access to the network.

If AMF 404 receives an indication that the serial number/MAC address and token are not valid (e.g., the token has expired, the token's quota is exhausted, etc.), at 510, the registration request is denied and IoT device 110 is denied access to the network. If the quota is exhausted and/or an old token has been provided, the WWA access network may ban IoT device 110 until a new token is provided. In one implementation, if IoT vendor 130 rejects the serial number/MAC address and the token, AMF 404 may reject the registration request and store the serial number/MAC address and token in a database with an indication that the serial number/MAC address and/or token are not valid. If IoT device 110 makes a subsequent request to connect to the network using the same combination of serial number/MAC address and token, AMF 404 may reject the registration request without verification from IoT vendor 130.

If the serial number/MAC address and token are valid, at 516, AMF 404 stores the serial number/MAC address and token in a database with an indication that the serial number/MAC address and token are valid. When a subsequent registration request with a serial number/MAC address and token is received, AMF 404 may perform a local lookup in the database to determine whether the serial number/MAC address and token have been stored and are valid. If the serial number/MAC address and token have been stored and are valid, AMF 404 may accept the subsequent registration request without validating the serial number/MAC address and token with IoT vendor 130. At 518, the registration request is accepted and AMF 404 may facilitate connection of IoT device 110 to the WWA access network for sending and receiving data until a data quota associated with the token has been exhausted.

Figure 6:
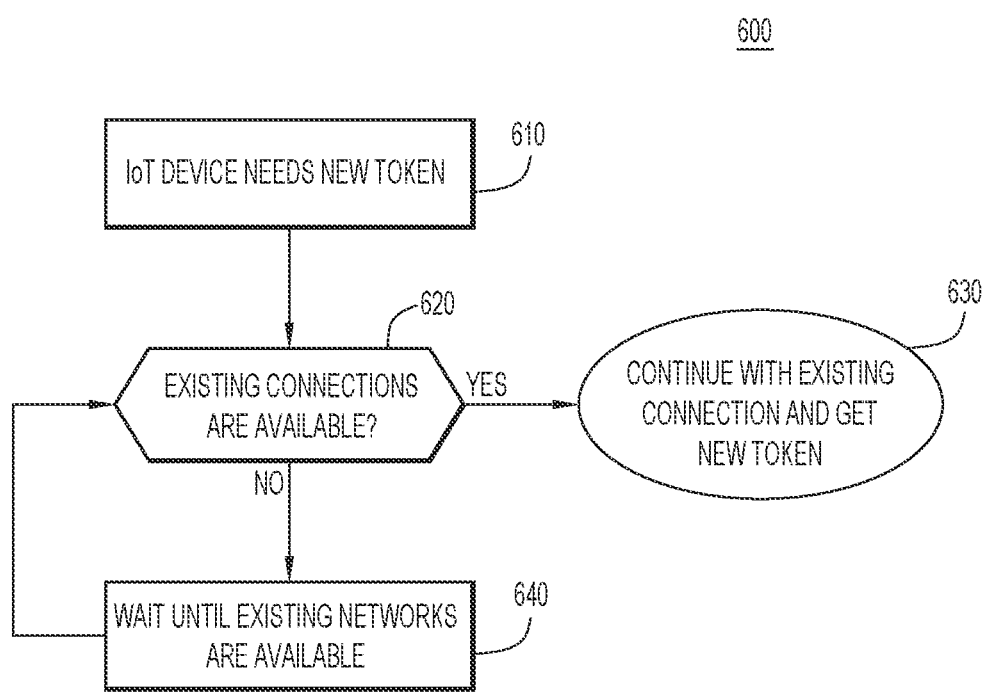
FIG. 6 is a flow chart depicting a method of refreshing a token, according to an example embodiment.

Referring to FIG. 6, FIG. 6 is a flow chart illustrating a method 600 for refreshing a token according to an example embodiment. In at least one embodiment, method 600 illustrates example operations that may be performed, at least in part, by IoT device 110 and IoT vendor 130, according to an example embodiment.

At 610, IoT device 110 may determine that a new token is needed. The token may be valid for a particular amount of time and IoT device 110 may periodically renew the token. Before an expiration of the token validity time, IoT device 110 may determine to renew or refresh the token. The token validity time may be multiple times larger than the token renewal time interval. At 620, IoT device 110 may determine whether existing connections are available. For example, if IoT device 110 is sending and/or receiving data via a Wi-Fi connection, IoT device 110 may determine whether the Wi-Fi connection is available. In other implementations, IoT device 110 may be sending and/or receiving data via a service provider's network (e.g., a 5G network), an Ethernet connection, an existing tethered connection using, for example, Bluetooth, via a connection with a service provider's network, or via another connection. If the existing connections are available, at 630, IoT device 110 may continue with the existing connection and obtain a new token. In one implementation, IoT device 110 may request the new token from IoT vendor 130. For example, if IoT device 110 transmits data to IoT vendor 130 infrequently (e.g., once a day), IoT device 110 may request a new token before the token expires. In another implementation, IoT vendor 130 may automatically send a new token to IoT device 110. For example, if IoT device 110 sends data periodically, IoT vendor 130 may insert the token into IoT device 110. IoT device 110 may obtain the token from IoT vendor 130. After obtaining the new token, IoT vendor 130 may store the new token. If the existing connection is not available, at 640, IoT device 110 waits until existing networks are available. IoT device 110 may continue to wait until an existing network is available and obtain the new token via an existing network when the existing network is available.

Figure 7:
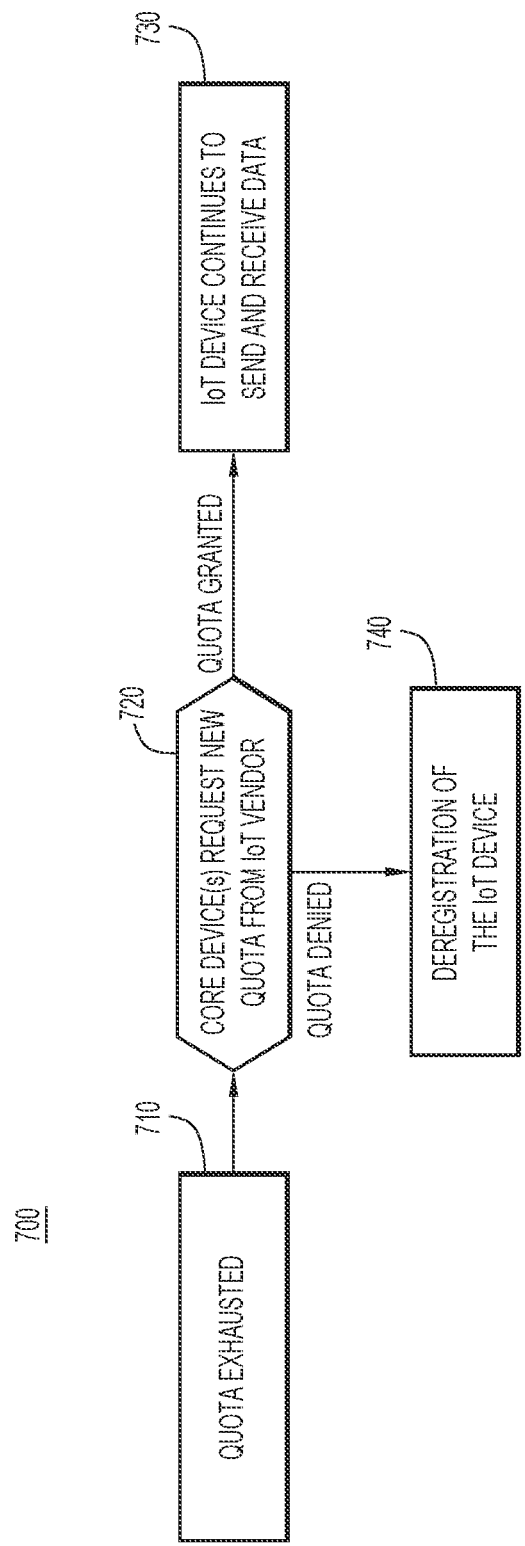
FIG. 7 is a flow chart depicting a method of replenishing a data quota associated with a token, according to an example embodiment.

Referring to FIG. 7, FIG. 7 is a flow chart illustrating a method 700 for requesting a new data quota for a token, according to an example embodiment. In at least one embodiment, method 700 illustrates example operations that may be performed, at least in part, by core device(s) 120 and IoT vendor 130, according to an example embodiment.

Referring to FIG. 7, IoT device 110 sends and/or receives data using a WWA access network and while IoT device 110 is connected to the WWA access network, an IoT device usage report and quota exhaustion information associated with IoT device 110 is shared with IoT vendor 130. For example, core device(s) 120 may report the data usage information and quota information to IoT vendor 130. At 710, the quota associated with a token associated with IoT device 110 is exhausted or nearly exhausted. At 720, core device(s) 120 associated with the 5G network may request a new quota from IoT vendor 130. For example, core device(s) 120 may notify IoT vendor 130 that the quota is about to expire and a new quota may be requested. If the quota is granted from IoT vendor 130, at 730, IoT device 110 continues to send and receive data until the new quota is exhausted or nearly exhausted. If the quota is denied by IoT vendor 130, the quota is exhausted and, at 740, IoT device 110 is disconnected and deregistered from the WWA access network. Additionally, IoT vendor 130 is notified that IoT device 110 has been deregistered and is no longer connected to the WWA access network.

Figure 8:
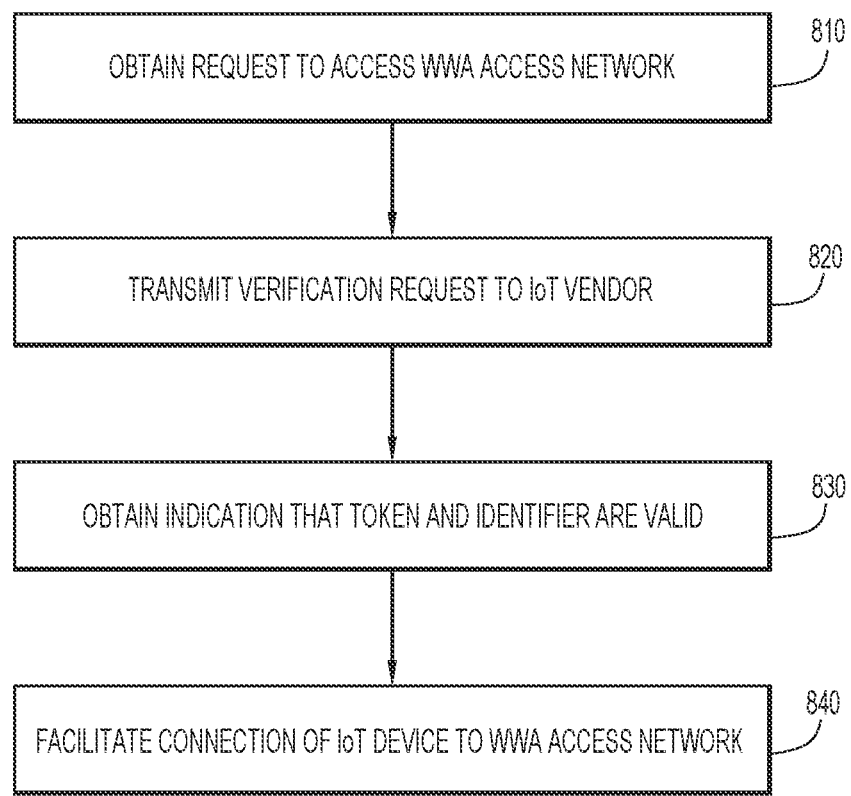
FIG. 8 is a flow chart depicting a method of facilitating connection of an IoT device to a service provider network, according to an example embodiment.

Referring to FIG. 8, FIG. 8 is a flow chart illustrating a method 800 for facilitating connection of IoT device 110 to a WWA access network, according to an example embodiment. In at least one embodiment, method 800 illustrates example operations that may be performed, at last in part, by IoT device 110, AMF 404, and IoT vendor 130.

At 810, AMF 404 obtains a request from IoT device 110 to access a WWA access network. The request may include an identifier associated with IoT device 110 and a token stored at IoT device 110. The identifier may include a serial number and/or MAC address associated with IoT device 110. At 820, AMF 404 transmits a verification request to IoT vendor 130 to verify the validity of the identifier and the token. The verification request may include the identifier and the token. In one implementation, AMF 404 may determine the IoT vendor 130 associated with IoT device 110 based on the identifier obtained from IoT device 110.

At 830, AMF 404 obtains an indication that the token and the identifier are valid. In one implementation, IoT vendor 130 may determine that the identifier and the token are valid and may transmit a message to AMF 404 indicating that the identifier and the token are valid. At 840, AMF 404 may facilitate connection of IoT device 110 to the WWA access network. For example, AMF 404 may allow IoT device 110 to complete the connection to the WWA access network to send and/or receive data based on the indication that the identifier and the token are valid.

Figure 9:
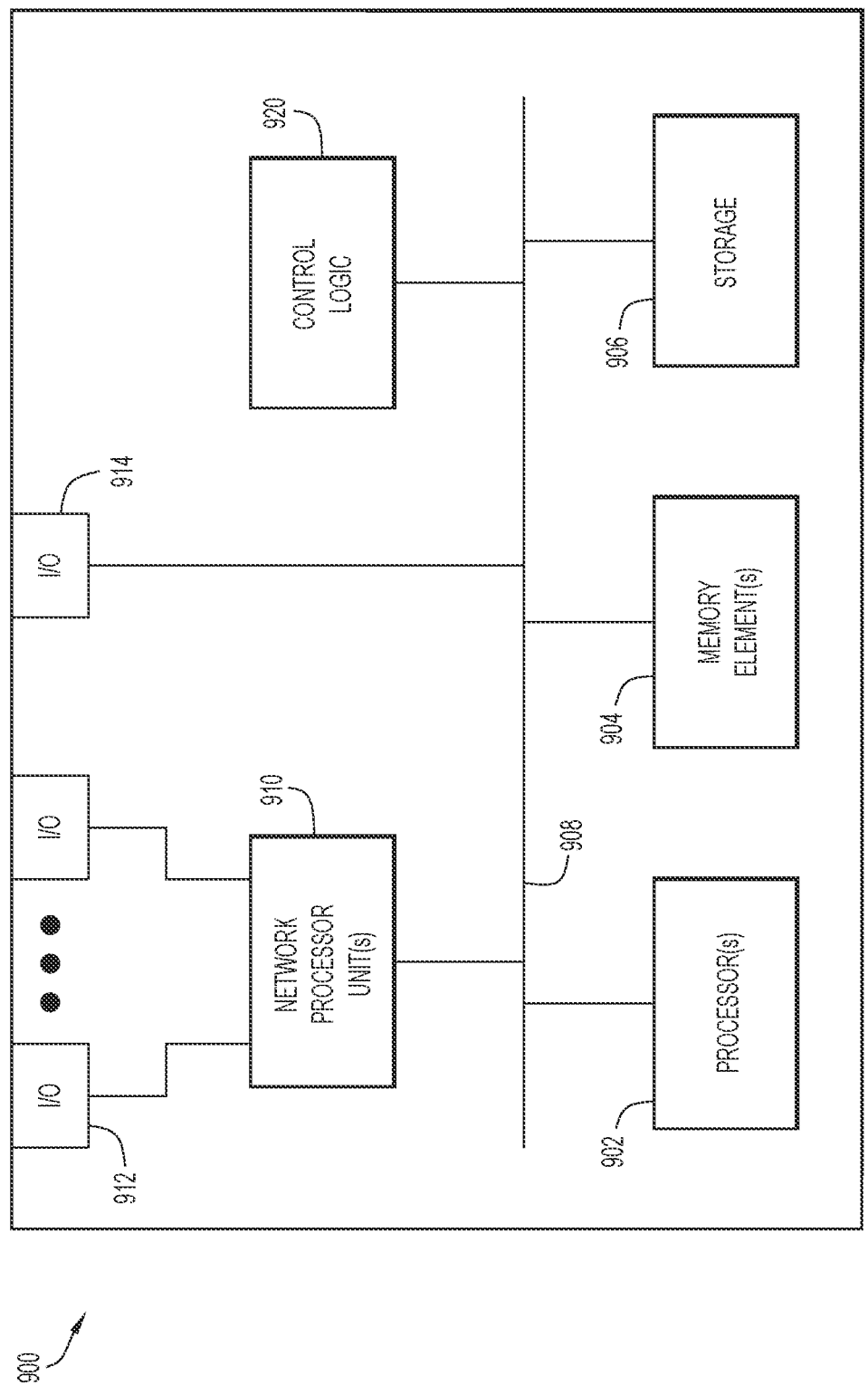
FIG. 9 is a hardware block diagram of a computing device that may perform functions associated with any combination of operations, in connection with the techniques discussed herein.

Referring to FIG. 9, FIG. 9 is a hardware block diagram of a computing device 900 that may perform functions associated with operations discussed herein. In various embodiments, a computing device or apparatus, such as computing device 900 or any combination of computing devices 900, may be configured as any entity/entities as discussed herein in order to perform operations of the various techniques discussed herein, such as, for example, any of core device(s) 120, AMF 404, and/or any other network element discussed for embodiments herein.

In at least one embodiment, computing device 900 may be any apparatus that may include one or more processor(s) 902, one or more memory element(s) 904, storage 906, a bus 908, one or more network processor unit(s) 910 interconnected with one or more network input/output (I/O) interface(s) 912, one or more I/O interface(s) 914, and control logic 920. In various embodiments, instructions associated with logic for computing device 900 can overlap in any manner and are not limited to the specific allocation of instructions and/or operations described herein.

In at least one embodiment, processor(s) 902 is/are at least one hardware processor configured to execute various tasks, operations and/or functions for computing device 900 as described herein according to software and/or instructions configured for computing device. Processor(s) 902 (e.g., hardware processor(s)) can execute any type of instructions associated with data to achieve the operations detailed herein. In one example, processor(s) 902 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 904 and/or storage 906 is/are configured to store data, information, software, and/or instructions associated with computing device 900, and/or logic configured for memory element(s) 904 and/or storage 906. For example, any logic described herein (e.g., control logic 920) can, in various embodiments, be stored for computing device 900 using any combination of memory element(s) 904 and/or storage 906. Note that in some embodiments, storage 906 can be consolidated with memory element(s) 904 (or vice versa), or can overlap/exist in any other suitable manner.

In at least one embodiment, bus 908 can be configured as an interface that enables one or more elements of computing device 900 to communicate in order to exchange information and/or data. Bus 908 can be implemented with any architecture designed for passing control, data and/or information between processors, memory elements/storage, peripheral devices, and/or any other hardware and/or software components that may be configured for computing device 900. In at least one embodiment, bus 908 may be implemented as a fast kernel-hosted interconnect, potentially using shared memory between processes (e.g., logic), which can enable efficient communication paths between the processes.

In various embodiments, network processor unit(s) 910 may enable communication between computing device 900 and other systems, entities, etc., via network I/O interface(s) 912 to facilitate operations discussed for various embodiments described herein. In various embodiments, network processor unit(s) 910 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 900 and other systems, entities, etc. to facilitate operations for various embodiments described herein. In various embodiments, network I/O interface(s) 912 can be configured as one or more Ethernet port(s), Fibre Channel ports, and/or any other I/O port(s) now known or hereafter developed. Thus, the network processor unit(s) 910 and/or network I/O interface(s) 912 may include suitable interfaces for receiving, transmitting, and/or otherwise communicating data and/or information in a network environment.

I/O interface(s) 914 allow for input and output of data and/or information with other entities that may be connected to computing device 900. For example, I/O interface(s) 914 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 920 can include instructions that, when executed, cause processor(s) 902 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

For example, in at least one implementation, control logic 920 can include instructions that, when executed, cause processor(s) 902 to perform operations including obtaining, from an IoT device, a request to access a WWA access network that includes a token and an identifier associated with the IoT device; transmitting a verification request to an IoT vendor associated with the IoT device to determine whether the token and the identifier are valid; obtaining an indication from the IoT vendor that the token and the identifier are valid; and facilitating connection of the IoT device to the WWA access network based on obtaining the indication that the token and the identifier are valid.

Figure 10:
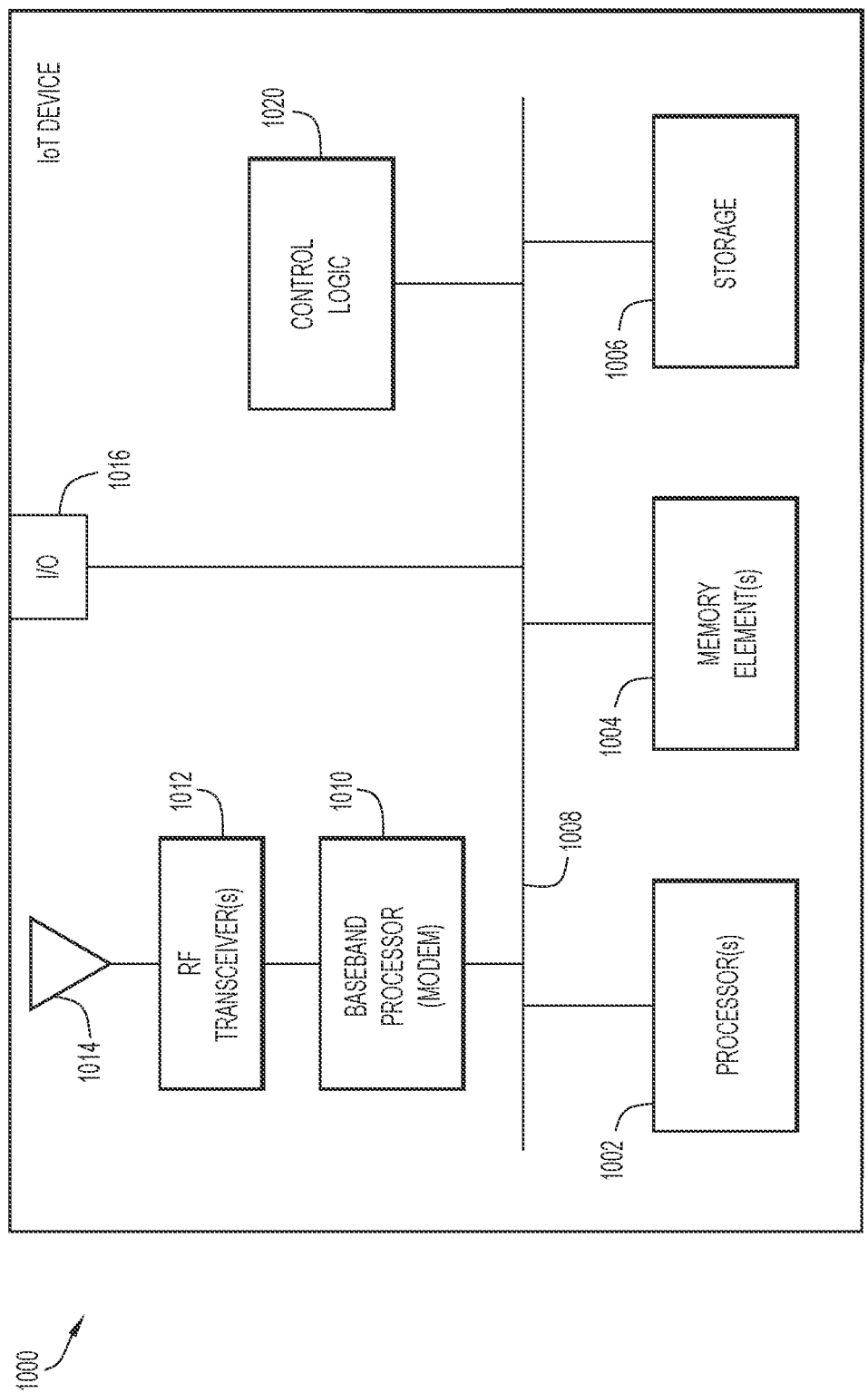
FIG. 10 is a hardware block diagram of a IoT device that may perform functions associated with any combination of operations, in connection with the techniques discussed herein.

Referring to FIG. 10, FIG. 10 illustrates a hardware block diagram of a user equipment 1000 that may perform functions associated with operations discussed herein. In various embodiments, a user equipment or apparatus, such as user equipment 1000 or any combination of user equipment 1000, may be configured as any radio node/nodes as depicted herein in order to perform operations of the various techniques discussed herein, such as operations that may be performed by any of a user device, such as IoT device 110.

In at least one embodiment, user equipment 1000 may be any apparatus that may include one or more processor(s) 1002, one or more memory element(s) 1004, storage 1006, a bus 1008, a baseband processor or modem 1010, one or more radio RF transceiver(s) 1012, one or more antennas or antenna arrays 1014, one or more I/O interface(s) 1016, and control logic 1020.

The one or more processor(s) 1002, one or more memory element(s) 1004, storage 1006, bus 1008, and I/O interface(s) 1016 may be configured/implemented in any manner described herein, such as described herein at least with reference to FIG. 9.

The RF transceiver(s) 1012 may perform RF transmission and RF reception of wireless signals via antenna(s)/antenna array(s) 1014, and the baseband processor (modem) 1010 performs baseband modulation and demodulation, etc. associated with such signals to enable wireless communications for user equipment 1000.

In various embodiments, control logic 1020, can include instructions that, when executed, cause processor(s) 1002 to perform operations, which can include, but not be limited to, providing overall control operations of user equipment 1000; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 920/1020) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, and register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 404/504 and/or storage 406/506 can store data, software, code, instructions (e.g., processor instructions), logic, parameters, combinations thereof, and/or the like used for operations described herein. This includes memory element(s) 904/1004 and/or storage 906/1006 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method is provided that may include obtaining, at a network device, a request from an IoT device to access a WWA access network, wherein the request includes a token and an identifier associated with the IoT device; transmitting, by the network device, a verification request to an IoT vendor associated with the IoT device to determine whether the token and the identifier are valid; obtaining, at the network device, an indication from the IoT vendor that the token and the identifier are valid; and facilitating connection of the IoT device to the WWA access network based on obtaining the indication that the token and the identifier are valid.

In one example, the identifier associated with the IoT device may include at least one of a serial number for the IoT device and a MAC address for the IoT device. In another example, the method may include identifying the IoT vendor associated with the IoT device based on the MAC address. In another example, the request from the IoT device may be a first request and the method may include storing the token and the identifier in a database in response to obtaining the indication that the token and the identifier are valid, obtaining a second request from the IoT device to access the WWA access network that includes a second token and a second identifier associated with the IoT device, performing a lookup to determine whether the second token and the second identifier match the token and the identifier stored in the database, and facilitating connection of the IoT device to the WWA access network when the second token and the second identifier match the token and the identifier stored in the database.

In another example, the token may be associated with a data quota, and facilitating the connection may include facilitating the connection until an amount of data indicated by the data quota is consumed by the IoT device. In another example, the network device includes an AMF device and wherein the WWA access network includes at least one of a 3GPP 4G/LTE network, a 3GPP 5G network, and a 3GPP nG network. In another example, the token is provided to the IoT device by the IoT vendor, the token is associated with a validity time period, and the token is renewed by the IoT vendor prior to an expiration of the validity time period.

In another form, an apparatus is provided comprising a memory; a network interface configured to enable network communications; and a processor, wherein the processor is configured to perform operations comprising: obtaining a request from an IoT device to access a WWA access network, wherein the request includes a token and an identifier associated with the IoT device; transmitting a verification request to an IoT vendor associated with the IoT device to determine whether the token and the identifier are valid; obtaining an indication from the IoT vendor that the token and the identifier are valid; and facilitating connection of the IoT device to the WWA access network based on obtaining the indication that the token and the identifier are valid.

In still another form, one or more non-transitory computer readable storage media encoded with instructions are provided that, when executed by a processor, cause the processor to execute a method comprising: obtaining a request from an IoT device to access a WWA access network, wherein the request includes a token and an identifier associated with the IoT device; transmitting a verification request to an IoT vendor associated with the IoT device to determine whether the token and the identifier are valid; obtaining an indication from the IoT vendor that the token and the identifier are valid; and facilitating connection of the IoT device to the WWA access network based on obtaining the indication that the token and the identifier are valid.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, and/or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    obtaining, at a network device, a request from an Internet of Things (IoT) device to access a wireless wide area (WWA) access network, wherein the request includes a token and an identifier associated with the IoT device;
    transmitting, by the network device, a verification request to an IoT vendor associated with the IoT device to determine whether the token and the identifier are valid;
    obtaining, at the network device, an indication from the IoT vendor that the token and the identifier are valid; and
    facilitating connection of the IoT device to the WWA access network based on obtaining the indication that the token and the identifier are valid.

2. The method of claim 1, wherein the identifier associated with the IoT device includes at least one of a serial number for the IoT device and a Media Access Control (MAC) address for the IoT device.

3. The method of claim 2, further comprising:
    identifying the IoT vendor associated with the IoT device based on the MAC address.

4. The method of claim 1, wherein the request from the IoT device is a first request, the method further comprising:
    storing the token and the identifier in a database in response to obtaining the indication that the token and the identifier are valid;
    obtaining a second request from the IoT device to access the WWA access network, wherein the second request includes a second token and a second identifier associated with the IoT device;
    performing a lookup to determine whether the second token and the second identifier match the token and the identifier stored in the database; and
    facilitating the connection of the IoT device to the WWA access network when the second token and the second identifier match the token and the identifier stored in the database.

5. The method of claim 1, wherein the token is associated with a data quota, and wherein facilitating the connection comprises facilitating the connection until an amount of data indicated by the data quota is consumed by the IoT device.

6. The method of claim 1, wherein the network device is an Access and Mobility Management Function (AMF) and wherein the WWA access network includes at least one of a Third (3rd) Generation Partnership Project (3GPP) Fourth (4th) Generation (4G)/Long Term Evolution (LTE) network, a 3GPP Fifth (5th) Generation (5G) network, and a 3GPP next Generation (nG) network.

7. The method of claim 1, wherein the token is provided to the IoT device by the IoT vendor, wherein the token is associated with a validity time period, and wherein the token is renewed by the IoT vendor prior to an expiration of the validity time period.

8. An apparatus comprising:
    a memory for storing data;
    a network interface configured to enable network communications; and
    a processor for executing instructions associated with the data, wherein executing the instructions causes the apparatus to perform operations, comprising:
        obtaining a request from an Internet of Things (IoT) device to access a wireless wide area (WWA) access network, wherein the request includes a token and an identifier associated with the IoT device;
        transmitting a verification request to an IoT vendor associated with the IoT device to determine whether the token and the identifier are valid;
        obtaining an indication from the IoT vendor that the token and the identifier are valid; and
        facilitating connection of the IoT device to the WWA access network based on obtaining the indication that the token and the identifier are valid.

9. The apparatus of claim 8, wherein the identifier associated with the IoT device includes at least one of a serial number for the IoT device and a Media Access Control (MAC) address for the IoT device.

10. The apparatus of claim 9, wherein executing the instructions causes the apparatus to perform further operations, comprising:
    identifying the IoT vendor associated with the IoT device based on the MAC address.

11. The apparatus of claim 8, wherein the request from the IoT device is a first request and wherein executing the instructions causes the apparatus to perform further operations, comprising:
    storing the token and the identifier in a database in response to obtaining the indication that the token and the identifier are valid;
    obtaining a second request from the IoT device to access the WWA access network, wherein the second request includes a second token and a second identifier associated with the IoT device;
    performing a lookup to determine whether the second token and the second identifier match the token and the identifier stored in the database; and
    facilitating the connection of the IoT device to the WWA access network when the second token and the second identifier match the token and the identifier stored in the database.

12. The apparatus of claim 8, wherein the token is associated with a data quota, and wherein executing the instructions cause the apparatus to perform further operations, comprising:
    facilitating the connection by facilitating the connection until an amount of data indicated by the data quota is consumed by the IoT device.

13. The apparatus of claim 8, wherein the apparatus is an Access and Mobility Management Function (AMF) WWA access network includes at least one of a Third (3rd) Generation Partnership Project (3GPP) Fourth (4th) Generation (4G)/Long Term Evolution (LTE) network, a 3GPP Fifth (5th) Generation (5G) network, and a 3GPP next Generation (nG) network.

14. The apparatus of claim 8, wherein the token is provided to the IoT device by the IoT vendor, wherein the token is associated with a validity time period, and wherein the token is renewed by the IoT vendor prior to an expiration of the validity time period.

15. One or more non-transitory computer-readable storage media encoded with instructions that, when executed by a processor, cause the processor to perform operations, comprising:
- obtaining a request from an Internet of Things (IoT) device to access a wireless wide area (WWA) access network, wherein the request includes a token and an identifier associated with the IoT device;
- transmitting a verification request to an IoT vendor associated with the IoT device to determine whether the token and the identifier are valid;
- obtaining an indication from the IoT vendor that the token and the identifier are valid; and
- facilitating connection of the IoT device to the WWA access network based on obtaining the indication that the token and the identifier are valid.

16. The one or more non-transitory computer-readable storage media of claim 15, wherein the identifier associated with the IoT device includes at least one of a serial number for the IoT device and a Media Access Control (MAC) address for the IoT device.

17. The one or more non-transitory computer-readable storage media of claim 16, further comprising instructions that, when executed by the processor, cause the processor to perform further operations, comprising:
- identifying the IoT vendor associated with the IoT device based on the MAC address.

18. The one or more non-transitory computer-readable storage media of claim 15, wherein the request from the IoT device is a first request and wherein the one or more non-transitory computer-readable storage media further comprising instructions that, when executed by the processor, cause the processor to perform further operations, comprising:
- storing the token and the identifier in a database in response to obtaining the indication that the token and the identifier are valid;
- obtaining a second request from the IoT device to access the WWA access network, wherein the second request includes a second token and a second identifier associated with the IoT device;
- performing a lookup to determine whether the second token and the second identifier match the token and the identifier stored in the database; and
- facilitating the connection of the IoT device to the WWA access network when the second token and the second identifier match the token and the identifier stored in the database.

19. The one or more non-transitory computer-readable storage media of claim 15, wherein the token is associated with a data quota, and wherein the one or more non-transitory computer-readable storage media further comprising instructions that, when executed by the processor, cause the processor to perform further operations, comprising:
- facilitating the connection by facilitating the connection until an amount of data indicated by the data quota is consumed by the IoT device.

20. The one or more non-transitory computer-readable storage media of claim 15, wherein the token is associated with a validity time period.

* * * * *